United States Patent [19]

Estes et al.

[11] Patent Number: 4,875,756
[45] Date of Patent: Oct. 24, 1989

[54] FRESNEL LENS APPARATUS FOR OPTICALLY COUPLING A PLURALITY OF DATA CHANNELS

[75] Inventors: Marvin F. Estes, Oakfield; Arnold W. Lungershausen, West Henrietta, both of N.Y.

[73] Assignee: Eastman Kodak Co., Rochester, N.Y.

[21] Appl. No.: 249,819

[22] Filed: Sep. 27, 1988

[51] Int. Cl.⁴ .............................................. G02B 6/36
[52] U.S. Cl. .............................. 350/96.20; 350/96.15; 350/96.18; 350/162.46; 250/227; 372/108
[58] Field of Search ................ 350/96.20, 96.15, 96.18, 350/96.21, 96.22, 162.16; 250/227; 372/108

[56] References Cited

U.S. PATENT DOCUMENTS

| | | | |
|---|---|---|---|
| 3,577,094 | 5/1971 | Tomlinson et al. | 372/108 |
| 4,109,997 | 8/1978 | Iverson | 350/96.15 |
| 4,109,998 | 8/1978 | Iverson | 350/23 |
| 4,258,976 | 3/1981 | Scott et al. | 350/96.20 |
| 4,278,323 | 7/1981 | Waldman | 350/96.20 |
| 4,398,791 | 8/1983 | Dorsey | 350/96.18 |
| 4,401,360 | 8/1983 | Streckmann et al. | 350/96.15 |
| 4,436,367 | 3/1984 | Lewis et al. | 350/96.20 |
| 4,444,459 | 4/1984 | Woodwell | 350/96.15 |
| 4,447,114 | 5/1984 | Koene | 350/96.20 |
| 4,460,242 | 7/1984 | Birch et al. | 250/227 |
| 4,466,695 | 8/1984 | Kruger | 250/227 |
| 4,472,052 | 9/1984 | Löfgren | 250/227 |
| 4,492,427 | 1/1985 | Lewis et al. | 350/96.20 |
| 4,511,934 | 4/1985 | Ohira et al. | 360/55 |
| 4,519,670 | 5/1985 | Spinner et al. | 350/96.15 |
| 4,550,985 | 11/1985 | Hayashi | 350/96.20 |
| 4,650,277 | 3/1987 | Husher et al. | 350/96.20 |
| 4,749,249 | 6/1988 | Hockaday et al. | 250/227 |
| 4,767,175 | 8/1988 | Böhner et al. | 350/96.20 |

FOREIGN PATENT DOCUMENTS 53-21912 of 1978 Japan.

OTHER PUBLICATIONS

"Fresnel Lenses as Fiber-Optic Demultiplexers", Electro Optical System Design, vol. 12, No. 6, 06/1980.

Primary Examiner—William L. Sikes
Assistant Examiner—Xuan Thi Vo
Attorney, Agent, or Firm—William F. Noval

[57] ABSTRACT

Disclosed is fresnel lens apparatus for optically coupling a plurality of data channels between stationary and rotating systems. Each data channel of the apparatus includes an optical data transmitter, an optical data receiver and a fresnel lens optical element. The plurality of fresnel lens optical elements are preferably annular and arranged concentrically in a plane. Each fresnel lens optical element focuses the optical data from a transmitter to a respective receiver which is positioned off axis with respect to the central axis of the concentric optical elements.

6 Claims, 4 Drawing Sheets

FIG. IB

FRESNEL LENS APPARATUS FOR OPTICALLY COUPLING A PLURALITY OF DATA CHANNELS

CROSS-REFERENCE TO A RELATED APPLICATION

Reference is made to commonly assigned, copending U.S. patent application Ser. No. 249,820; filed Sept. 27, 1988; entitled "Optical Data Signal Apparatus For Optically Coupling A Plurality of Data Channels Between Stationary and Rotating Systems"; Inventors M. F. Estes and A. W. Lungershausen.

BACKGROUND OF THE INVENTION

This invention relates in general to apparatus for coupling data between stationary and rotary systems. More particularly this invention relates to fresnel lens apparatus for optically coupling a plurality of data channels between the rotating and stationary structure of the rotary head scanner of a magnetic tape recorder.

Advanced magnetic tape recording and reproducing systems require ever higher data transfer rates and increased bandwidths. In helical scan magnetic tape recorders using rotary head scanners, there must be some means for transmitting signals between the rapidly rotating head wheels upon which the recording and reproducing heads are mounted and stationary signal processing circuitry. Typically, rotary transformers are used to transmit both the record and reproduce signals from and to the magnetic heads carried by the rotating head wheel. Rotary transformers, however, have a predicted upper frequency limit of approximately 150 megahertz. Moreover, at such high signal frequencies, dimensional tolerances between the stationary and rotary coils of the rotary transformer are severe and cross talk between adjacent rotary transformers is difficult to eliminate.

In order to mitigate the disadvantages of rotary transformers, several proposals have been made to optically transmit signals between the stationary and rotating structure of a rotary head scanner. Optical transmission has an upper frequency limit of six gigahertz at the present time, with an unknown limit in the future. Moreover, crosstalk between record and reproduce signals and crosstalk between adjacent channels is virtually eliminated and dimensional tolerances are less severe. Where only one or two signals (for example, record and reproduce signals) are to be optically transmitted between the rotating and stationary structure of a rotary head scanner, the simplest technique is to have the optical signal transmission axis coincide with the axis of rotation of the head wheel or to have, at least either the optical signal transmitter or receiver coincident with the axis of rotation of the rotating head wheel. Such a technique is disclosed, for example, in Japanese Kokai Patent No. 53-21912, published Feb. 28, 1978, Inventors, Koshimoto et al.; in U.S. Pat. No. 4,401,360, issued Aug. 30, 1983, Inventors Streckmann et al.; and in U.S. Pat. No. 4,511,934, issued Apr. 16, 1985, Inventors Ohira et al. The arrangements disclosed in these patents are generally not easily adaptable to the transmission of multiple optical signals over separate optical paths. In order to minimize interference between the signals, either a half mirror or filter is used to separate two optical signals transmitted over the same optical axis which coincides with the axis of rotation of the head wheel.

Although multiplexing techniques (for example, time division multiplexing, frequency division multiplexing or wavelength division multiplexing) may be used to optically transmit multiple signals along the same optical axis, the circuitry required to multiplex and demultiplex such signals is complex and costly and susceptible to crosstalk and signal degradation. Thus, it is desirable to optically transmit each signal along a separate optical path in order to minimize such difficulties. Several techniques have been proposed for providing optical transmission between a first array of optical elements mounted on a rotating body and a second complementary array of optical elements mounted on a stationary or rotating body. Thus, in U.S. Pat. No. 4,447,114, issued May 8, 1984, Inventor Koene, there is disclosed an optical coupling body which is disposed between first and second arrays of optical conductors mounted for rotation at equal but opposite rates relative to the optical coupling body. Either light reflective or light transmissive means is arranged in the body to effect constant coupling of individual conductors in the first array with respective conductors in the second array. A similar technique is disclosed in U.S. Pat. No. 4,109,998, issued Aug. 29, 1978, Inventor Iverson and U.S. Pat. No. 4,258,976 issued Mar. 31, 1981, Inventors Scott et al. As disclosed, a derotation assembly is located between a stationary body and a rotating body having respective complementary arrays of optical transmitting and optical receiving elements. The derotation plate is rotated at half the speed of the rotating body. The optical transmission arrangements of the latter three patents are disadvantageous because of mechanical and electrical complexity, cost, and unreliability.

U.S. Pat. No. 4,519,670, issued May 28, 1985, Inventors Spinner et al., discloses a light rotation coupling for the transmission of a plurality of light channels between two parts which rotate relative to each other. A plurality of radially arrayed light transmitters rotate about an axis which coincides with the optical axis of a multiple refractive or reflective light transmitting optical assembly. A plurality of light receivers are axially arrayed along the optical/rotation axis. This technique is disadvantageous because of the use of complex, expensive and heavy optical transmission assemblies. Moreover, locating the light receivers on the axis of rotation is disadvantageous for several reasons. First, the coupling system is bulky and not suitable for applications where space is at a premium. Moreover, bidirectional transmission of data is difficult because the optical data channels are interfered with by the electrical conductors and hardware associated with the other optical data receivers. Thus, data cannot be transmitted at all times.

In another proposed optical signal transmission technique, individual optical slip rings are stacked along the axis of rotation of a moving body. Thus, U.S. Pat. No. 4,278,323, issued July 14, 1981, Inventor Waldman, discloses an optical signal transmission system which includes a plurality of axially spaced optical fiber rings rotatably mounted on a spindle. The rings are mounted in a fixed casing having a number of separate chambers corresponding to the number of optical fiber rings. Fixed fiber optic blocks surround each fiber optic ring. Complementary LEDs and photodiodes are respectively embedded in each optic fiber ring and block to effect optical signal transmission between the stationary optic fiber block and the rotating optical fiber ring. In U.S. Pat. No. 4,444,459, issued Apr. 24, 1984, Inventor Woodwell, a fiber optic slip ring comprises a toroidal optic wave guide which is uncoated along a circumferential window extending along the inner or outer circumference of the wave guide. An electronic device for transmitting an optical signal is connected to one end of the wave guide. A ring of radiation is produced so that an optical signal receiver may be positioned at any location around the circumference of the wave guide to receive the transmitted optical signal. As disclosed in the latter patent, a plurality of slip rings may be arrayed along the rotational axis of the receiver in order to effect transmission of a plurality of separate optical signals. The optical slip ring systems of the latter two patents are disadvantageous, among other reasons, because of the inefficiency in producing a 360° ring of radiation.

SUMMARY OF THE INVENTION

According to the present invention, there is provided optical data signal apparatus which obviates the disadvantages of the prior art. According to an aspect of the present invention, a plurality of optical data signals may be coupled between stationary and rotating members by means of an optical coupling assembly which is simple, light-weight and inexpensive. Moreover, crosstalk between coupled optical data signals is substantially minimized.

According to an aspect of the invention, an optical data signal apparatus includes an optical data signal transmitter and an optical data signal receiver which are rotatable with respect to one another about a rotational axis. The receiver and the transmitter are both spaced from the rotational axis. The apparatus includes a preferably annular, substantially planar, fresnel lens optical coupling element which has a central axis coincident with the rotational axis. The fresnel lens optical coupling element causes a collimated optical data signal, transmitted by said transmitter along a path, preferably perpendicular, to said optical element, to be focused along a path to said receiver.

According to another aspect of the present invention, the optical data signal receiver is stationary, the optical data signal transmitter rotates about a rotational axis relative to said stationary receiver, and the fresnel lens optical coupling element is stationary and causes an optical data signal transmitted by said rotating transmitter to be focused to said stationary receiver.

According to a further aspect of the present invention, the optical data signal transmitter is stationary, the optical data signal receiver rotates about a rotational axis relative to said transmitter, and the fresnel lens optical coupling element rotates about the rotational axis in synchronism with the receiver and causes an optical data signal transmitted by the stationary transmitter to be focused to the rotating receiver.

According to still another aspect of the present invention, a plurality of optical data signals are transmitted and received between stationary and rotating members which may comprise the stationary and rotating components of a rotary magnetic head scanner of a helical magnetic tape recorder.

BRIEF DESCRIPTION OF THE DRAWINGS

In the detailed description of a preferred embodiment of the invention presented below, reference is made to the accompanying drawings in which like elements are numbered with like numbers.

FIGS. 1A and 1B are diagrammatic perspective views useful in explaining the present invention.

DETAILED DESCRIPTION OF THE PREFERRED EMBODIMENT

In the following description of preferred embodiments of the present invention, specific application will be described relating to rotary head scanners in helical scan magnetic tape recording/reproducing apparatus. It will be understood, however, that the present invention may be used in any application where data signals are to be optically coupled between a rotating body and a stationary body. Other such applications include, for example, coupling of optical data signals between rotating signal processing equipment and stationary signal processing equipment, such as in radar equipment or the like.

Figure 1A:
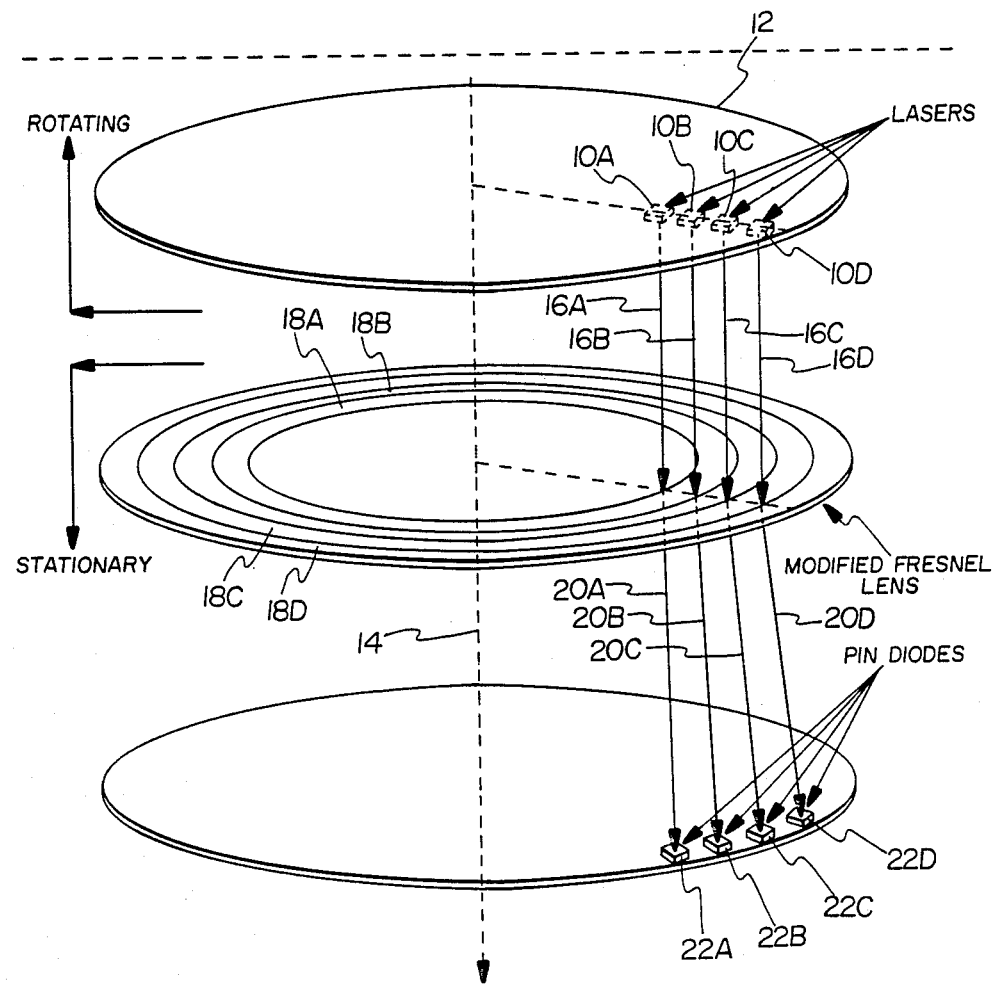

Referring now to FIG. 1A, there is shown a diagrammatic perspective view illustrating a general embodiment of the present invention. As shown, optical data signal transmitters 10A, 10B, 10C, 10D mounted on member 12 rotate about rotational axis 14. Transmitters 10A-10D (which may, for example, be laser diodes) transmit collimated optical data signals along respective paths 16A, 16B, 16C, 16D which are perpendicular to fresnel lens optical coupling elements 18A, 18B, 18C, 18D. Optical coupling elements 18A-18D comprise concentric annular, substantially planar, fresnel lens optical elements. Optical coupling elements 18A-18D are stationary and cause the collimated data signals to be focused along paths 20A-20D to respective optical data signal receivers 22A-22D which are spaced from rotational axis 14. Receivers 22A-22D may, for example, be photodiodes or the like.

Each fresnel lens optical coupling element 18A-18D has a central axis which is coincident with rotational axis 14. Each of elements 18A-18D is dimensioned to be coextensive with the circular path of radiation transmitted by its respective transmitter 10A-10D, in completing a revolution about axis 14. An optical element 18A-18D has a width which is determined by the size of the beam of optical signal transmitted by a transmitter 10A-10D. The fresnel optical characteristics of an optical coupling element 18A-18D are such as to focus radiation which is perpendicular to element 18 at any point around its length to a single point which is off of the rotational axis 14. The optical data signal receiver is placed at this point in space.

Figure 6:
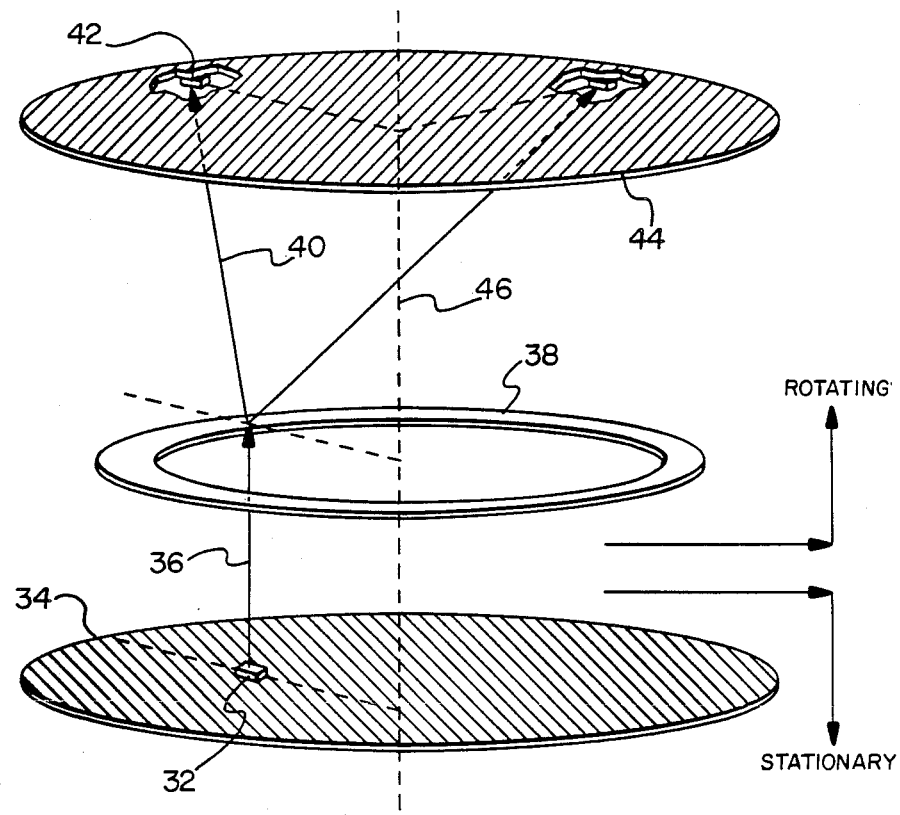
FIG. 6 is a diagrammatic perspective view of a technique for making a fresnel lens optical element for use in the present invention.
Figure 6:
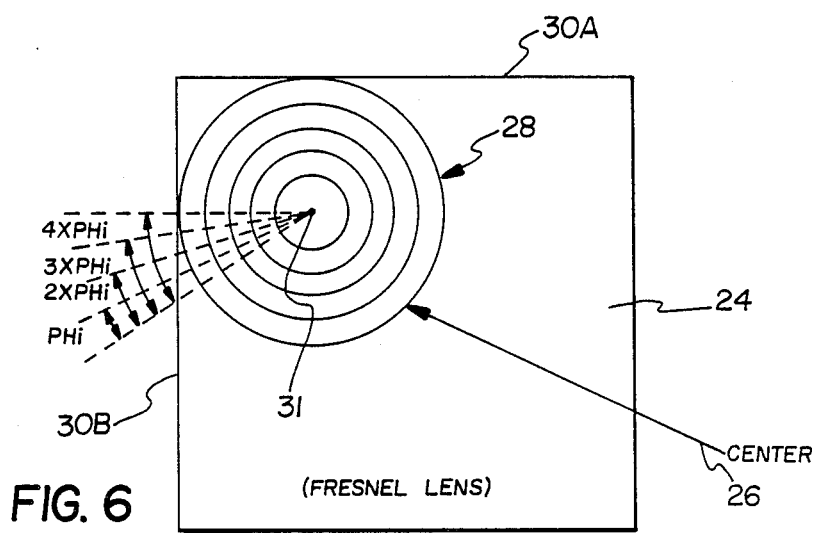

Optical coupling elements 18A-18D are fresnel optical elements which may be made according to the technique illustrated in FIG. 6. It will be understood that any other technique known to the those skilled in the art may be used to form the fresnel lens. As shown, a fresnel lens is configured as a planar sheet 24 with the center of the lens at the center 26 of the sheet. Light rays parallel to a central axis passing through center 24 will be focused at a point on the axis. The fresnel lens includes a plano side and concentric sections of convex lens surfaces each of which is equidistant from the plano side. The surface angle of each section increases as its radial distance increases from the central axis. The annular fresnel optical elements 18A–18D (FIG. 1A) may be prepared by cutting a circular piece 28 from sheet 24. The circle is defined by using two adjacent sides 30A and 30B and center 26 of sheet 24. The center 31 of this circle is used to cut out annular elements 18A–18D. The annular elements are respectively rotated by an angle Nx phi. Thus, annular fresnel optical element 18D is rotated by an angle phi, annular fresnel optical element 18C is rotated by an angle 2× phi, annular fresnel optical element 18B is rotated an angle 3× phi; and annular fresnel optical element 18A is rotated by an angle 4× phi. By this technique, light rays which impinge perpendicularly on an annular fresnel optical element are caused to be focused to the focal point of lens 24 offset by the angle of rotation of the element (i.e., phi, 2× phi, etc.). Thus, optical signal data receivers 22A–22D are located in a circle circumferentially displaced by the appropriate offset angles.

The width of the annular ring need only be equal to the width of the collimated radiation beam impinging on it. Thus, a plurality of optical signal data channels may be provided by assembling a plurality of concentric annular fresnel optical elements in a plane. Each such element has a different radius and focuses an optical data signal to a different point in space which is off of the central axis of the annular optical element. By using optical techniques, the individual data channels can have an extremely high bandwidth. The optical element is small, light-weight and occupies little volume since the element is substantially planar. Moreover, crosstalk between adjacent channels is substantially eliminated. It will be understood that the fresnel lens may take any configuration other than annular as described herein.

Referring now to FIG. 1B, there is shown another embodiment of the present invention. As shown, optical data signal transmitter 32, mounted on stationary member 34, transmits an optical data signal along a path 36 which is perpendicular to rotating fresnel optical coupling element 38. Element 38 comprises an annular ring which focuses optical data signal 36 along a path 40 to optical data signal receiver 42 mounted on rotating member 44. Element 38 and receiver 42 are rotated in synchronism about rotational axis 46. Fresnel optical coupling element 38 has a central axis which is coincident with rotational axis 46. Receiver 42 and transmitter 32 are spaced from rotational axis 32, so that optical coupling element 38 focuses perpendicular radiation impinging on it to a point (receiver 42) which is off of axis 46.

Referring now to FIGS. 2–5, there is shown another embodiment of the present invention, as incorporated in a rotary magnetic head scanner of a helical scan magnetic tape recorder. As shown, rotary head scanner 48 includes upper and lower stationary drums 50 and 52, and a rotating head wheel 54 upon which are mounted a plurality of magnetic heads, such as, heads 56 and 58. Scanner 48 is mounted in a helical scan, magnetic tape recording/reproducing apparatus, in which a magnetic tape 60 is transported between supply and take-up reels (not shown) around scanner 48. Tape 60 is wrapped around scanner 48 in a helical path so that as head wheel 54 rotates, record/reproduce heads 56 and 58 record to and reproduce from slant tracks on tape 60. Head wheel 54 is rotatably mounted on a shaft 62 which is rotated by head wheel drive circuit 64. Circuit 64 includes a motor (not shown) mechanically linked to shaft 62 and also includes a tachometer (not shown) which is linked to shaft 62 to provide speed and phase control signals to control the rotational speed and phase of the motor.

According to the present invention, record and reproduce signals are optically coupled between rotary record/reproduce circuit 66 and stationary record/reproduce circuit 68 by means of an optical data signal apparatus. Such apparatus includes rotating assembly 70 mounted on head wheel 54 and stationary assembly 72 mounted on stationary drum 52. The optical data signal apparatus of the invention is capable of transmitting far greater bandwidth and higher frequency signals between the stationary and rotating members of scanner 48 than is possible with conventional rotary signal transformers. Thus, whereas the upper frequency of a rotary transformer is limited to less than 200 megahartz, optical signals may be transmitted in the several gigahartz range. Optical signal transmission provides excellent signal to noise ratio; minimizes signal degradation during transmission; and eliminates electromagnetic and radio frequency interference from external and internal sources. Moreover, by providing a separate optical coupling link for each record and reproduce channel, crosstalk between channels is virtually eliminated. The optical data signal apparatus of the invention is simple in design and construction, light-weight, inexpensive and may be manufactured at low cost, by well-known mass production manufacturing techniques due to less severe dimensional tolerances than rotary transformers.

Figure 2:
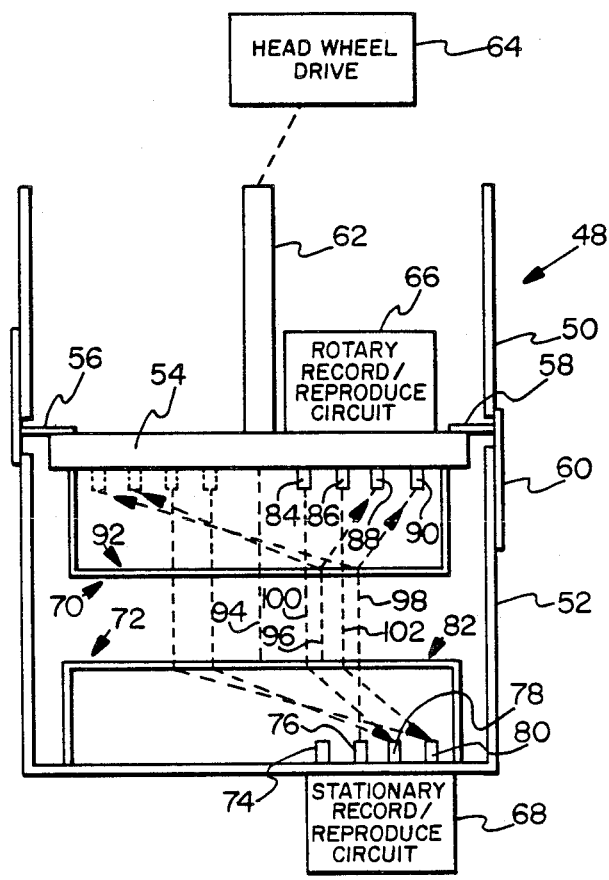
FIG. 2 is a diagrammatic elevational view of a multi-channel embodiment of the present invention.

Referring to FIG. 2, stationary assembly 72 includes first and second stationary optical data signal transmitters 74 and 76 and first and second stationary optical data signal receivers 78 and 80. Assembly 72 also includes stationary fresnel optical coupling element 82. Rotary assembly 70 includes first and second rotating optical data signal transmitters 84 and 86 and first and second rotating optical data signal receivers 88 and 90. Rotating assembly 70 also includes a rotating fresnel optical coupling assembly 92.

Rotating transmitters 84 and 86 are radially spaced from rotational axis 94 of head wheel 54. Stationary transmitters 74 and 76 are also radially spaced from axis 94, but at different radial distances than transmitters 84 and 86. This staggered spacing assures that collimated optical data signals 96 and 98 from stationary transmitters 74 and 76, respectively, do not interfere with collimated optical data signals 100 and 102 transmitted by rotating transmitters 84 and 86. Thus, there is substantially no crosstalk between adjacent channels and bidirectional communications may be effected between the rotating and stationary systems of rotary scanner 48.

Figure 3:
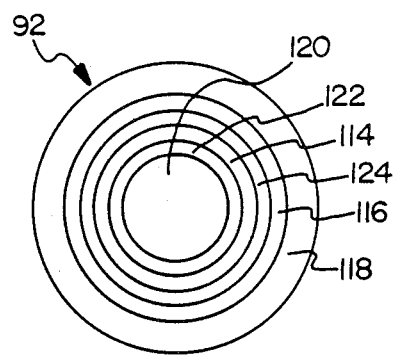
FIGS. 3 and 4 are respectively plan views of the optical coupling elements of the apparatus of FIG. 2.
Figure 4:
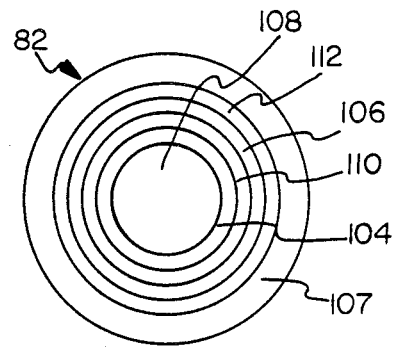
Figure 5:
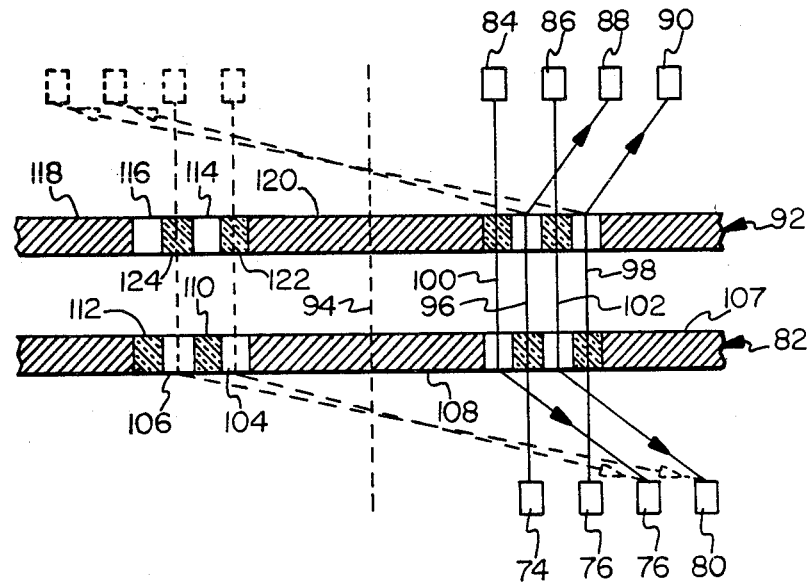
FIG. 5 is a diagrammatic elevational view which is useful in explaining the operation of the embodiment of FIG. 2.

Referring now to FIGS. 3–5, the construction and operation of assembly 70 and assembly 72 will be described in greater detail. As shown, stationary fresnel optical coupling assembly 82 includes substantially planar, annular fresnel optical coupling elements 104 and 106 which are concentric about central axes which coincide with rotational axis 94 of head wheel 54. Assembly 82 also has opaque areas 107 and 108 and transparent annular rings 110 and 112. Rotating fresnel optical coupling assembly 92 includes substantially planar, annular fresnel optical coupling elements 114 and 116 having central axes which are coincident with the rotational axis 94. Elements 114 and 116 are concentric and rotatable about axis 94. Assembly 92 also includes opaque regions 118 and 120 and optically transparent annular rings 122 and 124.

Assemblies 82 and 92 are parallel to each other and perpendicular to axis 94. Transparent rings 122 and 124 of assembly 92 are axially aligned with fresnel optical coupling rings 104 and 106, respectively, of assembly 82. Thus, collimated optical data signals transmitted by rotating transmitters 84 and 86, will pass through rings 122 and 124 and impinge perpendicularly on fresnel optical coupling elements 104 and 106. Fresnel optical element rings 104 and 106 cause the optical data signals to be focused to stationary optical data signal receivers 78 and 80. Similarly, the optically transparent rings 110 and 112 of stationary assembly 82 are axially aligned with fresnel optical coupling elements 114 and 116 of rotating assembly 92. Thus, collimated optical data signals transmitted by stationary transmitters 74 and 76, will pass through rings 110 and 112 and impinge perpendicularly on optical coupling elements 114 and 116. Elements 114 and 116 cause the data signals to be focused to rotating optical data signal receivers 88 and 90.

Although the optical data signals transmitted by transmitters 74 and 76 and 84 and 86 may comprise a single signal, it will be appreciated that such signals may be multiplexed according to well known multiplexing techniques, so that a plurality of signals may be transmitted over a single channel. Thus, time-division multiplexing, frequency division multiplexing and radiation-wave division multiplexing may be utilized to increase the number of separate signals transmitted over a single channel to and from head wheel 54. It will also be appreciated that although the apparatus of FIG. 2 is described as having two sending and two receiving channels, any number of optical data signal channels may be between the stationary and rotating systems of rotary scanner 48.

The invention has been described in detail with particular reference to preferred embodiments thereof, but it will be understood that variations and modifications can be effected within the spirit and scope of the invention.

What is claimed is:

1. Optical data signal apparatus comprising: an optical data signal transmitter, an optical data signal receiver, and means for mounting said transmitter and said receiver for relative rotation with respect to one another about a rotational axis in a plane which is perpendicular to said rotational axis, wherein said transmitter and said receiver are axially spaced from one another and each of which is radially spaced from said axis; and a substantially planar, fresnel optical coupling element which is spaced from and located between said transmitter and said receiver, which has a central axis coincident with said rotational axis and which causes a collimated optical data signal, which is transmitted by said transmitter along a first path to said element, to be focused along a second path to said receiver.

2. The apparatus of claim 1 wherein said receiver is stationary:

wherein said transmitter rotates about said rotational axis; and wherein said fresnel optical element is stationary and focuses an optical data signal transmitted by said rotating transmitter to said stationary receiver.

3. The apparatus of claim 1 wherein said transmitter is stationary;

wherein said receiver rotates about said rotational axis; and wherein said fresnel optical element rotates about said rotational axis in synchronism with said receiver and focuses an optical data signal transmitted by said stationary transmitter to said rotating receiver.

4. Optical data signal apparatus comprising:

a stationary member which has a central axis and which mounts a stationary optical data signal transmitter and a stationary optical data signal receiver, each of which is radially spaced from said central axis;

a rotating member which is spaced from and which rotates about a rotational axis coincident with said central axis of said stationary member; wherein said rotating member mounts a rotating optical data signal transmitter and a rotating optical data signal receiver each of which is radially spaced from said rotational axis;

a stationary, annular, substantially planar, fresnel optical coupling element located between said stationary and said rotating members and a rotating, annular, substantially planar, fresnel optical coupling element, located between said stationary and said rotating members, each of which has a central axis which is coincident with said rotational axis, and is spaced at a different radial distance from said rotational axis;

wherein said stationary fresnel optical coupling element causes a collimated optical data signal transmitted by said rotating optical data signal transmitter to be focused to said stationary optical data signal receiver; and wherein said rotating fresnel optical coupling element causes a, collimated optical data signal transmitted by said stationary optical data signal transmitter to be focused to said rotating optical data signal receiver.

5. Optical data signal apparatus comprising:

a stationary member which has a central axis and which mounts first and second stationary, optical data signal transmitters radially spaced from said central axis and first and second stationary, optical data signal receivers radially spaced from said central axis;

a rotating member which is spaced from said stationary member and which rotates about a rotational axis coincident with said central axis of said stationary member; wherein said rotating member mounts first and second rotating, optical data signal transmitters radially spaced from said rotational axis and first and second rotating, optical data signal receivers radially spaced from said rotational axis;

a stationary fresnel optical coupling assembly, located between said stationary and said rotating members, which has first and second, concentric, annular, stationary fresnel optical coupling elements and which has a central axis which is coincident with said rotational axis, wherein said coupling elements are disposed in a plane perpendicular to said rotational axis;

a rotating fresnel optical coupling assembly, located between said stationary and rotating members, which has first and second, concentric, annular, fresnel optical coupling elements which rotate in a plane perpendicular to said rotational axis, and which has a central axis which is coincident with said rotational axis; said annular fresnel optical elements of said rotating assembly being radially spaced from said rotational axis at different distances than said annular fresnel optical elements of said stationary assembly;

wherein said first and second fresnel optical coupling elements of said stationary optical coupling assembly cause, collimated optical data signals transmitted by said first and second rotating optical data signal transmitters to be respectively focused on said first and second stationary optical data signal receivers; and wherein said first and second fresnel optical coupling elements of said rotating optical coupling assembly cause, collimated optical data signals transmitted by said first and second stationary optical data signal transmitters to be respectively focused on said first and second rotating optical data signal receivers.

6. The apparatus of claim 5 wherein said rotating member is a rotating head wheel of a rotary magnetic head scanner having a plurality of magnetic record/reproduce heads; and wherein said rotating transmitters and receivers are mounted on said head wheel and are electrically connected to said plurality of magnetic record/reproduce heads.

* * * * *